March 14, 1939.  A. B. DAVIS  2,150,155
METHOD OF GROOVING INKING ROLLS
Original Filed Dec. 23, 1935
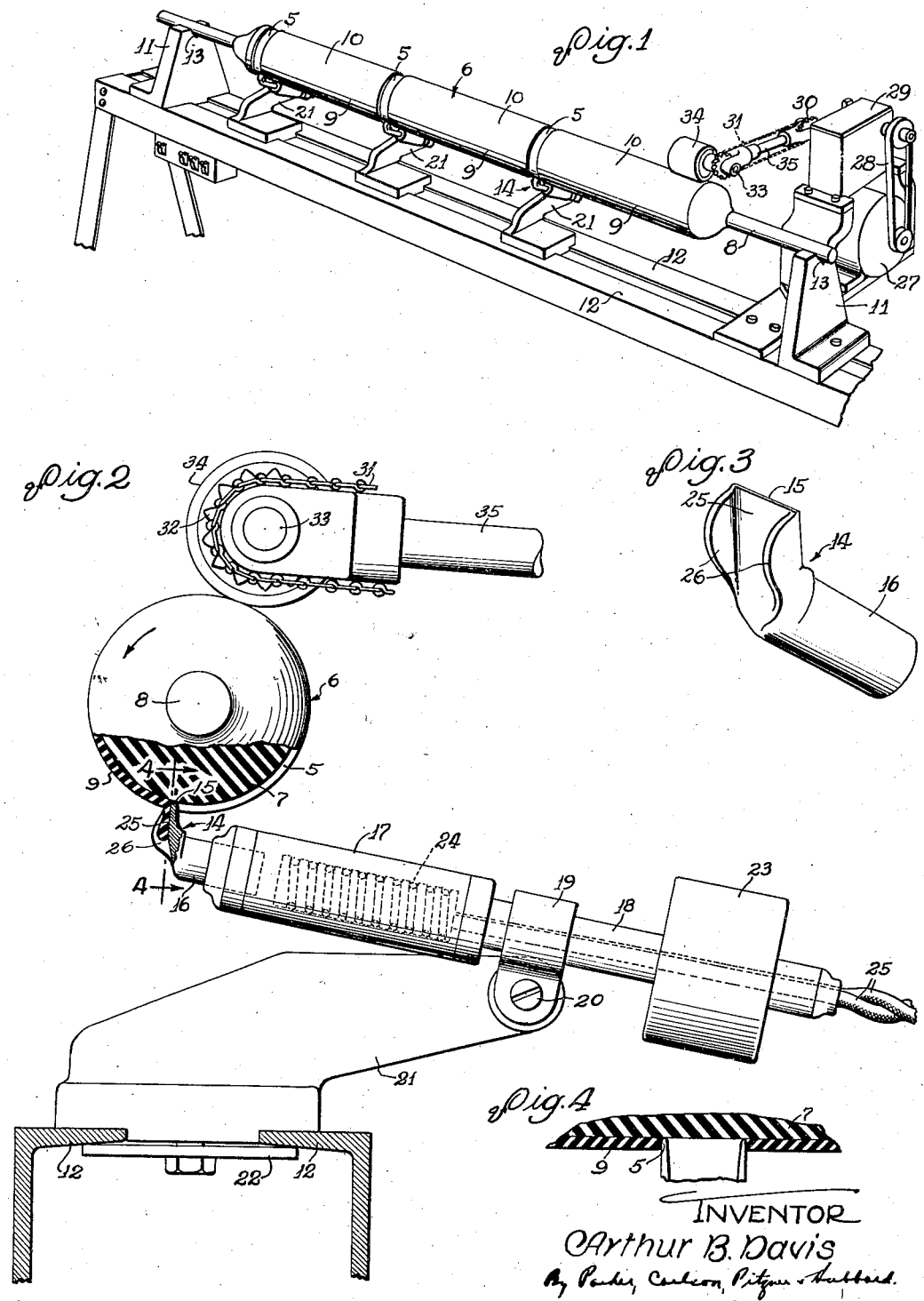
INVENTOR
Arthur B. Davis
By Parker, Carlson, Pitzner & Hubbard
ATTORNEYS Patented Mar. 14, 1939

2,150,155

UNITED STATES PATENT OFFICE 2,150,155

METHOD OF GROOVING INKING ROLLS

Arthur B. Davis, Springfield, Ohio, assignor to Ideal Roller & Manufacturing Company, Chicago, Ill., a corporation of Illinois Application December 23, 1935, Serial No. 55,879
Renewed December 8, 1937

3 Claims. (Cl. 18—48)

This invention relates to the sectioning of rolls such as are used to carry inks of different colors in multi-color printing presses.

The general object of the invention is to provide a new and improved method of and apparatus for turning annular grooves in the periphery of a roll having a surface composed of printer's composition or other meltable material. This object is carried out generally by reducing to a fluid or free flowing state the material to be removed and diverting the melted material off from the roller.

Other objects and advantages of the invention will become apparent from the following detailed description taken in connection with the accompanying drawing, in which—

Figure 1 is a perspective view of a machine for sectioning rollers in accordance with the present invention.

Fig. 2 is a fragmentary end elevational view of the machine.

Fig. 3 is a perspective view of the grooving tool.

Fig. 4 is a fragmentary sectional view taken along the line 4—4 of Fig. 3.

While the improved method may be practiced in various ways and with various forms of apparatus, I have shown in the drawing and will herein describe in detail the preferred apparatus, but it is to be understood that I do not intend thereby to limit the invention but aim to cover all modifications falling within the spirit and scope of the invention as expressed in the appended claims.

Printer's composition which is the surface material now generally employed on inking rolls, comprises a mixture of glue, glycerine and water which has no definite melting point but will begin to soften at a temperature of about 125 degrees Fahrenheit and flow freely at somewhat higher temperatures, for example 150 degrees.

In the drawing, the invention is illustrated as applied to the formation of a series of narrow annular grooves 5 in the periphery of an inking roller 6 comprising a cylindrical base 7 of vulcanized rubber or like material fast on a metal stock 8 and covered with a uniform coating 9 of congealed printer's composition. The thickness of the coating 9 may be varied as desired and usually ranges from .025 to .040 of an inch. The grooves divide the peripheral surface of the roll into longitudinally spaced sections 10 on which inks of different colors may be carried during printing.

Generally stated, the invention contemplates formation of the grooves 5 by maintaining a source of heat at a temperature above that at which the composition will melt and flow freely, conducting heat from such source to localized areas corresponding to the cross-sectional shape of the groove to be formed, effecting relative rotation between the roller and the point of heat application, and diverting the melted composition off from the roller.

Preparatory to the grooving operation, the roller is rotatably supported in horizontal position on brackets 11 mounted for relative horizontal adjustment along rails 12 to accommodate rollers of different lengths. The brackets have V-shaped bearing sockets 13 at their upper ends to receive opposite ends of the roller shaft 8.

The heat for melting localized areas of the composition 9 is applied and diversion of the melted composition off from the roller effected by a tool 14 heated to a temperature substantially above the melting point of the composition and tapered to a straight edge 15 which, during the grooving operation, is positioned to enter the composition to the desired depth. Herein the tool comprises a block of metal having a shank 16 received in a metal sleeve 17 on the end of a tube 18 gripped by a clamp 19 and supported thereby to turn about a horizontal pivot 20. The latter is supported by a bracket 21 adjustable along the rails 12 and adapted to be secured thereto by a clamping member 22 so as to locate the tool edge 15 in the proper position longitudinally of the roller. By adjusting the tube 18 relative to the clamp 19, the tool edge 15 may be positioned beneath the roller parallel to the axis thereof and adapted to enter the lowermost portion of the composition 9 and bear against the surface of the rubber base 7. A weight 23 on the tube 18 urges the tool upwardly maintaining the edge 15 in light contact with the periphery of the rubber base 7.

Within the sleeve 17 is an electric heating element 24 suitably insulated from the metal parts and supplied with current through conductors 25 extending through the tube. The capacity of the heater 24 is such that it is capable of supplying heat at a temperature sufficiently high to maintain the tool edge 15 at a temperature substantially above that at which the composition 9 will melt and flow freely. A temperature of 325 to 350 degrees Fahrenheit has been found satisfactory for use with a composition which will flow freely when heated to 150 degrees.

With the tool positioned as shown in Fig. 2, the groove 5 is formed by effecting relative rotation between the tool and the roller in the direction indicated by the arrow and at a speed correlated with the temperature of the tool and sufficiently slow to permit the composition to be removed from each circumferential portion of the coating to be reduced to a free flowing state. The melted composition is diverted off from the roller by the tool and, by virtue of the projection of the tool end in substantially vertical position, drains down along the end face 25 between the wings 26 at the side edges of the tool. In this way, the composition is maintained in a free flowing state until it drops off from the tool. Any danger of the melted composition again congealing and piling up on the roller is avoided.

Confining of the melting action of the tool to those portions of the composition immediately adjacent the tool edge so as to form an accurately shaped groove with a smooth uninterrupted defining surface is attributable not only to the manner in which the heat is applied but also to the fact that the rubber of which the base roller is composed is a poor conductor of heat, and the further fact that the glue-glycerine mixture constituting the printers' composition has no definite melting point but softens gradually upon heating. As a result, only that portion of the composition immediately adjacent the tool edge 15 is rendered fluid during the time it is exposed to the action of the tool. In view of this high degree of heat localization, substantially all of the composition which is melted and actually heated to a free flowing state will be scraped or diverted off from the roller and drain downwardly. Some of the composition not so removed will be softened to some extent but this will congeal immediately upon passing the tool edge thereby leaving continuous smooth surfaces defininig the groove which may be rounded slightly at its edges.

To rotate the roller at a predetermined peripheral speed regardless of its diameter, rotary power from an electric motor 27 is applied frictionally to the surface of the coating 5. To this end, the motor shaft operates through the medium of a belt 28 and suitable speed reduction gearing within a box 29 to drive a sprocket wheel 30 which is connected by an endless chain 31 to a sprocket wheel 32 on a shaft 33 which carries a drive wheel 34. The shaft 33 is journaled in the bifurcated end of an arm 35 which projects above the roller to be sectioned and is pivotally supported at its opposite end on the shaft carrying the sprocket 30. Under the weight of the arm 35, the wheel 34 bears downwardly against the peripheral surface of the roller coating thereby providing the friction necessary to rotate the roller at a slow speed during operation of the motor. With composition of the character above described and with the tool edge 15 heated to approximately 350 degrees Fahrenheit, the roller is preferably turned at a peripheral speed of approximately fourteen inches per minute. The maximum permissible speed will of course vary somewhat with various factors.

Where harder composition is used which cannot be melted to the required depth under the above conditions, two revolutions may be required for completion of the groove. Or if desired, the peripheral speed may be decreased in order to complete the groove in one revolution.

Any number of the tool units above described may be mounted on the rails 12 and the machine thus adapted for forming several of the grooves simultaneously as illustrated in Fig. 1.

I claim as my invention:

1. The method of forming a peripheral groove in a printer's roller having an inking surface composed of printer's composition or the like, said method comprising maintaining a source of heat at a temperature substantially above that at which said composition will melt and flow freely, continuously conducting heat from said source to a section of the surface composition corresponding in cross sectional shape and location to the groove to be formed, advancing the point of heat application around the roller at a rate such as to permit melting of the composition within said section to a free flowing state, and diverting the composition thus melted off from the roller.

2. The method of forming a peripheral groove in a printer's roller having an inking surface composed of printer's composition or the like, said method comprising maintaining a source of heat at a temperature substantially above that at which said composition will melt and flow freely, continuously conducting heat from said source to a section of the surface composition corresponding in cross sectional shape and location to the groove to be formed, relatively rotating the point of heat application and said roller at a rate correlated with the temperature of said heat source and such as to permit melting of the composition within said section to a free flowing state and diverting the melted composition off from the roller.

3. The method of forming a shallow groove in a printer's roller by liquifaction as distinguished from cutting of the meltable material of which the roller periphery is composed, said method comprising maintaining at a temperature substantially above that at which said material will melt and flow freely a grooving element composed of heat-conducting material and having an edge shaped according to the cross-section of the groove to be formed, positioning said element with said edge contacting the periphery of the roller, moving the element as the material is melted by said edge until the edge has entered to the desired depth of said groove, and relatively rotating the roller and said element at a speed sufficiently slow to cause reduction of the material within a localized area immediately adjacent said edge to a free flowing state and diversion of the liquid material thus formed off from the roller.

ARTHUR B. DAVIS.